(12) United States Patent
Traut

(10) Patent No.: US 7,158,927 B2
(45) Date of Patent: *Jan. 2, 2007

(54) SYSTEM AND METHOD FOR THE LOGICAL SUBSTITUTION OF PROCESSOR CONTROL IN AN EMULATED COMPUTING ENVIRONMENT

(75) Inventor: Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 10/971,345

(22) Filed: Oct. 22, 2004

(65) Prior Publication Data

US 2005/0055192 A1 Mar. 10, 2005

Related U.S. Application Data

(63) Continuation of application No. 09/747,492, filed on Dec. 21, 2000, now Pat. No. 7,085,705.

(51) Int. Cl.
*G06F 9/455* (2006.01)

(52) U.S. Cl. .......................... 703/23; 703/26; 710/104

(58) Field of Classification Search ................. 703/23, 703/26; 710/104
See application file for complete search history.

(56) References Cited

U.S. PATENT DOCUMENTS 7,085,705 B1 * 8/2006 Traut ........................... 703/23

* cited by examiner

*Primary Examiner*—Albert W. Paladini
(74) *Attorney, Agent, or Firm*—Woodcock Washburn LLP

(57) ABSTRACT

In an emulated computing environment, a method is provided for logically decoupling the host operating system from the processor of the computer system with respect to certain processor settings of the processor. A hypervisor of the emulation program replaces some of the processor settings of the processor with processor settings associated with software routines or data structures provided by the guest operating system. The replaced processor settings are written to memory. During this period, when the processor calls a software routine or accesses a data structure associated with the replaced processor setting, the processor will call or access a software routine or access a data structure associated with the guest operating system, bypassing the host operating system and communicating directly with the guest operating system. When the host operating system is to be recoupled to the processor, the processor settings that have been saved to memory are rewritten to the appropriate registers of the processor.

22 Claims, 3 Drawing Sheets

SYSTEM AND METHOD FOR THE LOGICAL SUBSTITUTION OF PROCESSOR CONTROL IN AN EMULATED COMPUTING ENVIRONMENT

CROSS REFERENCE TO RELATED APPLICATIONS

This application is a continuation of U.S. patent application Ser. No. 09/747,492 filed Dec. 21, 2000 now U.S. Pat. No. 7,085,705.

This application is related to commonly assigned U.S. patent application Ser. No. 10/971,948 filed concurrently herewith.

FIELD OF THE INVENTION

The present invention relates in general to the field of computer system emulation and, more particularly, to a method for transparently decoupling the host operating system from the processor of the computer system in favor of control by the processor by the guest operating system.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software designed for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

A hypervisor is a control program that exists near the kernel level of a host operating system and operates to allow one or more secondary operating systems, other than the host operating system, to use the hardware of the computer system, including the processor of the computer system. A hypervisor of an operating system emulates the operating environment of the secondary operating system so that the secondary operating system believes that it is operating in its customary hardware and/or operating system environment and that it is in logical control of the computer system, when it may in fact be operating in another hardware and/or operating system environment and the host operating system may be in logical control of the computer system. Many operating systems function such that the operating system must operate as though it is in exclusive logical control of the hardware of the computer system. For multiple operating system to function simultaneously on a single computer system, the hypervisor of each operating system must function to mask the presence of the other operating systems such that each operating system functions as though it has exclusive control over the entire computer system.

If it is desired to emulate the entire hardware architecture of the guest system, it is often useful or desirable to make maximum use of the hardware in the host computer system, including, for example, the memory management unit, the context switching hardware, the exception handling vectors, the interrupt routine pointers, and the floating point units of the host processor; and the memory of the host computer system. This hardware, however, is normally under the control of the host operating system and is shielded from access by user-level or application software. An exception is an event occurring in the computer system that cannot be resolved by the processor. An interrupt is a request sent to the processor to temporarily interrupt the current instruction stream to perform some other operation.

One option to avoid this difficulty is to employ an emulation program that does not attempt to use the lower level hardware of the host computer system. This sort of approach is often in the case of emulation program that resides as an application program and runs on the host operating system. These application emulation programs, of course, are subject to the performance penalties of being an application program that runs on the host operating system of a host computer system. Further, these application emulation programs only gain access to the hardware features that are exposed to the application emulation program by the host operating system. As an example, an emulation program that runs as an application on the host operating system can include an exception handler. The difficulty is that the exception handler of the emulation program is separated from the processor of the host computer system by several software layers, creating a latency between the time that the host processor issues and exception and the time that the exception is identified to the exception handler of the emulation program. Another option is for the emulation program to share the hardware with the host operating system, assuming that support for the sharing of computer system by an emulation program can be written into the hypervisor of the host operating system.

SUMMARY OF THE INVENTION

The present invention concerns a technique for logically decoupling a host operating system from a processor of the computer system. According to the method of the present invention, a hypervisor of an emulation program reads in a set of the processor settings of the processor. These processor settings are saved by the hypervisor to main memory. The hypervisor replaces these processor settings with a set of processor settings associated with software routines or data structures provided by the guest operating system. These software routines or data structures may include exception and interrupt handler routines and page tables. As a result of the substitution of processor settings, the host operating system is decoupled from processor control in that at least some of the processor settings of the processor are associated with software routines or data structures provided by the guest operating system, and are no longer associated with software routines or data structures provided by the host operating system. To recouple the host operating system to the processor, the hypervisor reads in the saved processor settings from memory and writes these processor settings to the appropriate registers of the processor.

The logical decoupling and recouping method disclosed herein is advantageous in that it allows the guest operating system to be more closely aligned with the processor for some functionality that can be provided by the guest operating system. In this manner, exception handler calls, interrupt handler calls, and memory management calls need not be passed from the processor to the host operating system before being passed to the guest operating system. Rather, these calls from the processor are passed directly to the guest operating system via the hypervisor of the emulation program.

The method disclosed herein is also advantageous in that the hypervisor or decoupling tool of the emulation program need not have access to the source code of the host operating system. Rather, the hypervisor decouples the host operating system from the processor in a manner that is transparent to the host operating system, which has no awareness that it has been decoupled or recoupled to the processor.

The method disclosed herein is also advantageous in that even if the host operating system is decoupled from the processor with respect to some functionality normally provided by the host operating system, the host operating system remains coupled to the host processor for the remainder of the functionality of the host processor. During this period, the host operating system continues to manage much of the hardware functionality of the computer system, allowing the guest operating system to route a print request through the host operating system.

Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF ILLUSTRATIVE EMBODIMENTS

Figure 1:
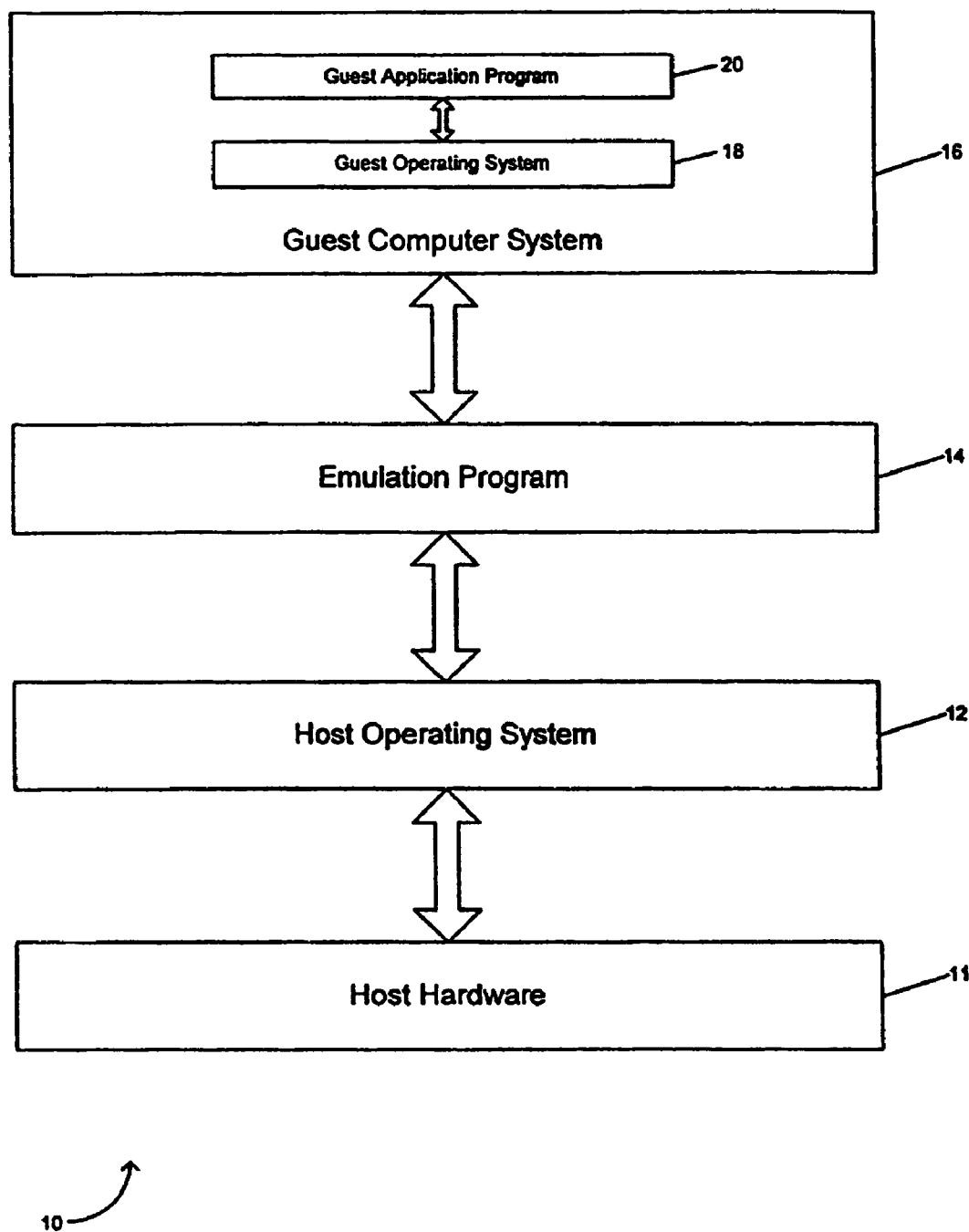
FIG. 1 is a diagram of the logical relationship of the elements of an emulated computer system running in a host computer system.

The present invention provides an emulation environment that allows the emulation software access to the lower level hardware components of the host computer system. The invention involves an emulation program that includes a hypervisor that is transparent to the host operating system. The hypervisor of the emulation program logically disconnects or decouples the operating system from exclusive control of the host computer system for brief periods, during which time the hypervisor of the emulation program is placed in control of the hardware of the host computer system, allowing the emulation program to be logically near, for brief periods, certain hardware features of the host computer system.

The processor state of the processor is a snapshot of all of the processor settings at a single point in time. These settings include both data that the processor is manipulating as well as the program counter, pointers, and other operational flags used by the processor. Because the data being manipulated by the processor and many other processor settings may change with each processor cycle, the processor state may likewise change with each processor cycle, and may change as often as many millions of times per second.

One subset of the processor state is the user state. Taken together, the data being manipulated by the processor and the processor's program counter comprise the user state of the processor. The user state is so named because the values that comprise the user state can be manipulated by an application-level program. The remainder of the processor settings of the processor state comprise the supervisor state or privileged state of the processor. The values of the supervisor state can only be modified by software that is part of the operating system of the computer system. The settings of the supervisor state or privileged state of the processor state cannot be accessed by an application-level program. The separation of processor settings between a user state, which is accessible by application-level programs, and a supervisor state, which is not accessible by application-level programs, allows the operating system to remain functional even if the application level program crashes or causes a fatal error.

The settings of the supervisor of privileged state of the processor generally fall into one of several categories. One category of the supervisor state of the processor is the processor's mode flags, which include the settings that instruct the processor to operate according to one of several modes to support certain computational situations, exception behavior, support for legacy programs, or the selective use of newer features of the processor. Another category of settings of the processor state are those settings that control external hardware access. Processors often support several operational settings for communication between the processor and hardware external to the processor, such as caches, memory, and other input and output devices. Because these operational settings, including the communication speed and bandwidth, for example, can only be modified by privileged or supervisor level code, they are considered to be part of the supervisor state of the processor.

Another category of settings of the privileged state of the processor are the exception and interrupt routine pointers. When the processor encounters an exception or is asked for an interrupt, the processor stops execution at the current program counter address and begins execution at a predetermined exception routine address. The location of these exception routines are identified through the use of exception routine pointers. For some processors, the exception routines are located at hard-coded memory addresses. On most processors, however, their locations are programmable and the value of the locations are considered to be part of the supervisor state of the processor.

A set of data structure pointers make up another category of the privileged state of the processor. Because some data structures of the processor state are too large to be stored in the processor, these data structure are stored in main memory and a pointer to the data structure is stored at the processor. An example of this sort of large data structure is the processor's page tables. These tables define for the processor the logical-to-physical translation of memory addresses that are necessary for the conversion of virtual memory accesses to physical memory locations. Both the page table and the pointer to the page table, which is stored at the processor, are considered to be part of the supervisor state of the processor. Another example of a data structure of the processor's supervisor state that is stored in main memory is an exception routine pointer table. Rather than storing the pointer for each exception routine at the processor, a single pointer stored at the processor can point to a table of exception routine pointers. The exception pointer or vector table will include a listing of address pointers to the exception handlers accessible by the processor. Both the exception routine pointer that is stored at the processor and the exception routine pointer table are considered part of the supervisor state.

The host operating system typically establishes for the processor the vectors or pointers to the exception and interrupt handler routines. If, for example, the processor is instructed to process a set of commands that will cause the processor to divide by zero, the processor will call the exception handler routine that handles the divide-by-zero exception. In doing so, the processor may call an exception handler routine that is pointed to by a vector stored at the processor. Alternatively, the processor may scan the exception vector table for the correct exception handler for the exception condition and then call the exception handler using the exception vector or pointer associated with the applicable exception handler.

When the host operating system is in logical control of the host processor, the host operating system defines for the host processor the exception vectors and all other vectors that will be needed by and are supported by the host processor. Should the processor encounter an exception condition or need to access another routine that is referenced by a vector, such as the page table routines and the page table vector, the processor executes the host operating system's exception handler.

In the case of an emulated computer system, an emulation program provides an emulated operating environment in the host computer system. Shown in FIG. 1 is a diagram of the logical layers of the hardware and software architecture for an emulated operating environment in a computer system 10. An emulation program 14 runs on a host operating system that executes on the host computer system hardware or processor 11. Emulation program 14 emulates a guest computer system 16, including a guest operating system 18. Guest application programs are able to execute on guest operating system 18. In the emulated operating environment of FIG. 1, because of the operation of emulation program 14, guest application 20 can run on the computer system 10 even though guest application 20 is designed to run on an operating system that is generally incompatible with host operating system 12 and host computer system hardware 11. In the architecture of FIG. 1, guest operating system 18 is separation from the host computer system hardware 11 across several logical and software layers, including the host operating system 12. This logical separation introduces latency and performance difficulties in those instances in which the guest operating system attempts to communicate directly with the host computer system hardware 11.

In the example of FIG. 1, host operating system 12 is in exclusive operating control of the host computer system hardware 11, including the processor of the host computer system. The host operating system will have established for the processor of the host computer system a number of the settings of the processor state. For example, the host operating system 12 may have established a set of exception handler vectors, whether located in a vector table or in the registers of the host processor, a set of interrupt handlers, and a page table vector. Thus, when the processor makes exception handler calls, interrupt handler calls, or memory management calls, the processor settings for these calls is provided on an exclusive basis by the host operating system. Because of the host operating system established the settings of the supervisor or privileged state of the processor, the host operating system is said to be in logical control of the processor of the host computer system.

Figure 2:
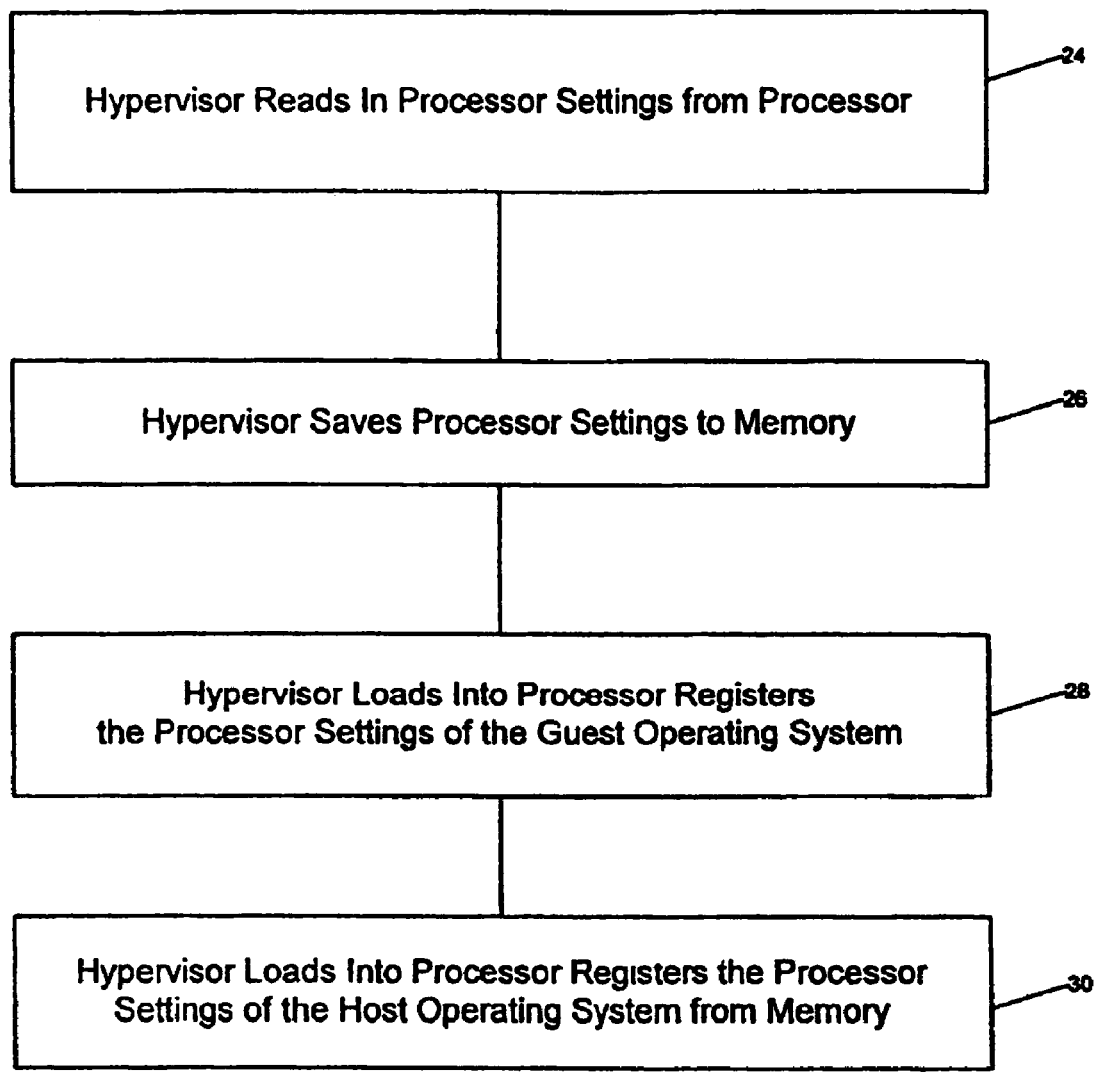
FIG. 2 is a flow diagram of the method for logically coupling a hypervisor of an emulation program to the processor of a computer system.

According to the emulation technique of the present invention, the emulation program itself includes a hypervisor that is able to logically disconnect or decouple the host operating system from exclusive control of the processor and other host computer system hardware 11. The hypervisor of emulation program 14 accomplishes the logical disconnection step by reading in and saving to a memory location the vectors and other address pointers that are used by the host processor. A flow diagram of the steps taken by the hypervisor to logically disconnect the host operating system from the exclusive control of the host computer system and to logically connect or couple the hypervisor of the emulation program to the host computer system are shown in FIG. 2. When the hypervisor of the emulation program wants to assert control over at least some of the processor settings of the processor, the hypervisor at step 24 reads in some or all of the settings of the supervisor or privileged state of the processor. According to one embodiment of the invention, the processor reads in the address pointers from the applicable registers of the processor, including the exception vectors or the pointer to the exception vector table, the interrupt pointers or the pointer to the interrupt routine table, and the pointer to the page table. At step 26, the hypervisor saves these processor settings, together with an identification of their associated storage location on the host processor, to memory. The hypervisor next substitutes at step 28 the user-level processor state of the guest operating system and the privileged-level state of the hypervisor of the emulation program. As a result, the processor settings of the host processor are replace with a combination of the user-level processor state of the guest operating system and the privileged-level state associated with the hypervisor of the emulation program. In doing so, the hypervisor stores in the appropriate registers of the processor the vectors and other address pointers to the exception handlers, interrupt routines, and page maps of the hypervisor of the emulation program and the guest operating system.

Figure 3:
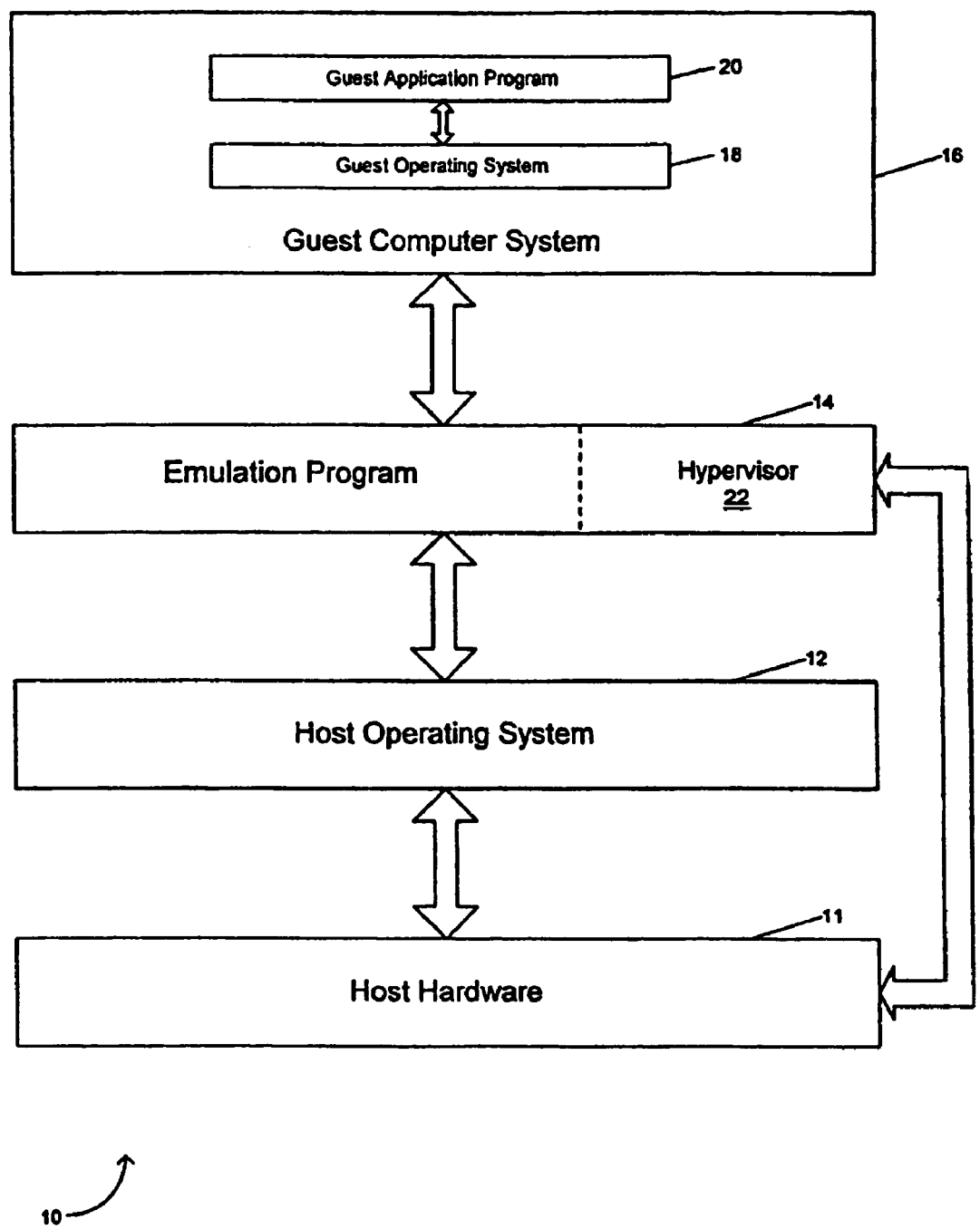
FIG. 3 is a diagram of the logical relationship of the elements of an emulated computer system in which a hypervisor is logically coupled to the processor of the computer system.

Because the processor settings that are substituted by the hypervisor of the emulation program are supervisor or privileged level settings, the hypervisor of the emulation program has logical control of the processor for all of the substituted processor settings. In this manner, the emulated computer system is logically in control of the hardware functionality of the host computer system for the functionality governed by the substituted processor settings. A diagram of the logical relationship of the emulation program 14 following substitution of the processor settings is shown in FIG. 3. Hypervisor 22 in FIG. 3 is shown as being a component of emulation program 14, which is shown as having a logical communication link to the processor and host hardware 11.

As an example of the emulation program's logical control of host hardware 11, if an exception were to occur during this period, the processor would call an exception handler provided by hypervisor of the emulation program. Similarly, if the processor is called on to translate a virtual memory address to a physical memory address, the processor will access the page table associated with the guest operating system. Thus, many settings of the processor states have been replaced so that the processor is calling upon or accessing software or data structures provided directly by the guest operating system. This allows the guest operating system to logically align itself more closely with the processor of the computer system, and eliminates the latency caused by separating the guest operating system from the processor of the computer system across the host operating system. In the case of an exception, the exception handler of the hypervisor may handle the exception itself or the exception handler of the hypervisor may invoke the exception handler of the guest operating system, allowing the guest operating system to directly handle the exception without the necessity of having the exception call pass through the host operating system software layer.

As shown in FIG. 3, host operating system 12 is not permanently disconnected form the hardware of the host computer system. The logical control asserted by the hypervisor over a set of processor settings does not result in hypervisor 22 assuming responsibility over all the hardware interaction in the computer system. During those periods when the host operating system is handling a function request relating to the hardware of the computer system, the host operating system must be in logical control of the computer system. To accomplish this, the host operating system must be temporarily logically recoupled to the hardware of the computer system. Once the host operating system has completed the functions requested by the emulation program, the emulation program can reassume its logical control over the exception and interrupt handlers associated with the processor setting of the emulation program.

With regard to the flow diagram of FIG. 2, at step 30, hypervisor 22 returns the logical control over the processor settings to the host operating system. Hypervisor 22 retrieves from memory the vectors and other pointers that were saved to memory. These address are written back to the appropriate register locations, returning logical control over these processor settings to the host operating system. During the period that the host operating system is logically disconnected from processor, the logical disconnection of host operating system 12 is not apparent to host operating system 12. Host operating system 12 is not aware that a set of processor setting have been substituted, resulting in the transfer of logical control for some hardware functionality to the emulation program. When logical control is returned to host operating system 12, host operating system 12 is similarly not aware that logical control of a set of hardware calls has been returned to it.

The substitution of the some of the processor settings of the processor supervisor states results in a performance gain by the emulation program as compared with the option of the handling by the emulation program of exceptions, interrupts, and memory management functions as filtered through the host operating system. In those cases in which the emulation program operates as an application program that resides on the host operating system, logically disconnecting the host operating system from exclusive control over the functionality of the processor is a performance advantage for the emulated computer system. Once the host operating system has been logically decoupled from at least some of the functionality of the processor, the emulation program, by substituting its processor settings for the processor settings of the host operating system, can operate much more closely with the host processor. Once the processor settings have been substituted, the emulation program can direct the processor to the emulation program's own set of exception vectors, interrupt routines, and page tables, thereby avoiding the latency problems caused when the host operating system separates the processor from the emulation program.

The interrupt and exception handling functions of the hypervisor of the present invention also permit the handling of exception and interrupts as expected by the guest operating system. An operating system may choose to handle certain exceptions at the operating system level without passing these exceptions to the application that initiated the exception. One example is the divide-by-zero exception, which is often handled at by the operating system without being passed to the application program that initiated the exception. The hypervisor of the emulation program can continue to pass exceptions to the guest operating system without the necessity of intiating an exception handler in the hypervisor. Thus, as expected, when a guest application program causes the initiation of a divide-by-zero exception at a time when the emulation program is in logical control of the processor with respect to the substituted processor settings, the hypervisor of the emulation program is able to pass the exception to the guest operating system.

The present invention is not limited in its application to the emulation of a particular computer system architecture, particularly the Intel 80X86 architecture. Rather, the emulation technique disclosed herein is applicable any time it is desirable that a host operating system be transparently disconnected from the processor with respect to at least some of the processor settings of the processor.

Although the present invention has been described in detail, it should be understood that various changes, substitutions, and alterations can be made thereto without departing from the spirit and scope of the invention as defined by the appended claims.

What is claimed:

1. A computer-readable medium comprising computer-readable instructions for emulating in a host computer system a guest computer system, the host computer system including a processor and a host operating system, comprising computer-readable instructions for:
   running an emulator program on the host system that emulates the operation of a guest operating system;
   reading in from the processor of the computer system a processor setting associated with the host operating system;
   writing the processor setting to memory; and
   writing to the processor a guest processor setting associated with the emulator program;
   whereby the host operating system is logically decoupled from the processor for the processor function related to the guest processor setting associated with the emulator program.

2. The computer-readable medium comprising computer-readable instructions for emulating in a host computer system a guest computer system of claim 1, further comprising instructions whereby the processor setting associated with the emulator program is an exception vector, and further comprising instructions whereby calling the exception handler pointed to by the exception vector.

3. The computer-readable medium comprising computer-readable instructions for emulating in a host computer system a guest computer system of claim 1, further comprising computer-readable instructions for:
   reading in from memory the processor setting associated with the host operating system; and
   writing to the processor the processor setting associated with the host operating system, further comprising instructions whereby the host operating system is logically coupled to the processor for the function related to the processor setting associated with the host operating system.

4. The computer-readable medium comprising computer-readable instructions for emulating in a host computer system a guest computer system of claim 1, further comprising computer-readable instructions for:
   temporarily logically recoupling the host operating system to the processor for the purpose of performing a function requested by the emulator program; and
   logically recoupling the emulator program to the processor for the function related to the processor setting associated with the emulator program following the completion by the host operating system of the function requested by the emulator program.

5. The computer-readable medium comprising computer-readable instructions for emulating in a host computer system a guest computer system of claim 1, further comprising instructions whereby the emulator program operates as an application program on the host operating system.

6. The computer-readable medium comprising computer-readable instructions for emulating in a host computer system a guest computer system of claim 1, further comprising instructions whereby the processor setting associated with the emulator program is an interrupt routine pointer, and further comprising instructions whereby calling the interrupt routine pointed to by the interrupt routine pointer.

7. The computer-readable medium comprising computer-readable instructions for emulating in a host computer system a guest computer system of claim 1, further comprising instructions whereby the processor setting associated with the emulator program is a pointer to an exception vector table, and further comprising instructions whereby accessing the exception vector table using the processor setting associated with the emulator program.

8. The computer-readable medium comprising computer-readable instructions for emulating in a host computer system a guest computer system of claim 1, further comprising instructions whereby the processor setting associated with the emulator program is a pointer to a page table associated with the guest computer system, and further comprising instructions whereby accessing the page table of the guest computer system using the processor setting associated with the emulator program.

9. A computer-readable medium comprising computer-readable instructions for logically decoupling a host operating system of a computer system from the processor of the computer system, comprising computer-readable instructions for:
   running as an application program on the host computer system an emulator program that emulates the operation of a guest operating system, the guest operating system having a set of functionality associated with the supervisor state of the processor of the computer system;
   replacing in the processor as part of a first replacement step a processor setting associated with the functionality of the guest operating system and the supervisor state of the processor such that the host operating system is logically decoupled from the processor with respect to the processor operations associated with the replaced processor setting; and
   replacing in the processor as part of a second replacement step a processor setting associated with the functionality of the host operating system such that the host operating system is logically recoupled to the host operating system with respect to the processor operations associated with the replaced processor setting.

10. The computer-readable medium comprising computer-readable instructions for logically decoupling a host operating system of a computer system from the processor of the computer system of claim 9, further comprising instructions whereby the processor setting associated with the functionality of the guest operating system is a pointer to an exception handler provided by the guest operating system.

11. The computer-readable medium comprising computer-readable instructions for logically decoupling a host operating system of a computer system from the processor of the computer system of claim 9, further comprising instructions whereby the processor setting associated with the functionality of the guest operating system is a pointer to a page table of the guest operating system.

12. The computer-readable medium comprising computer-readable instructions for logically decoupling a host operating system of a computer system from the processor of the computer system of claim 9, further comprising computer-readable instructions for:
   temporarily logically recoupling the host operating system to the processor for the purpose of performing a function requested by the emulator program; and
   logically recoupling the emulator program to the processor for the processor settings associated with the guest operating system following the completion by the host operating system of the function requested by the emulator program.

13. The computer-readable medium comprising computer-readable instructions for logically decoupling a host operating system of a computer system from the processor of the computer system of claim 9 further comprising instructions whereby the first replacement step comprises the steps of,
   reading in from an identifiable register of the processor a processor setting associated with the host operating system; and
   writing the processor setting read in from memory to memory.

14. The computer-readable medium comprising computer-readable instructions for logically decoupling a host operating system of a computer system from the processor of the computer system of claim 13, further comprising instructions whereby the second replacement step comprises the steps of,
   reading in from memory the processor setting associated with the host operating system; and
   writing the processor setting to the identifiable register of the processor.

15. The computer-readable medium comprising computer-readable instructions for logically decoupling a host operating system of a computer system from the processor of the computer system of claim 13, further comprising instructions whereby the memory is RAM memory.

16. The computer-readable medium comprising computer-readable instructions for logically decoupling a host operating system of a computer system from the processor of the computer system of claim 9, further comprising instructions whereby the processor setting associated with the functionality of the guest operating system is a pointer to an exception handler provided by the guest operating system.

17. A computer-readable medium comprising computer-readable instructions for rerouting calls by a processor of a computer system to a guest operating system being emulated on a host operating system of the computer system, comprising computer-readable instructions for:
   reading in a first set of processor settings from the processor, the processor settings being associated with functionality provided by the host operating system;
   storing the first processor settings in memory;
   writing in a second set of replacement processor settings to the processor, the replacement set of processor settings associated with the functionality provided by the guest operating system, further comprising instructions whereby with respect to the functionality associated with the replacement set of processor settings, the host operating system is logically decoupled from the processor and the guest operating system is logically coupled to the processor.

18. The computer-readable medium comprising computer-readable instructions for rerouting calls by a processor of a computer system to a guest operating system being emulated on a host operating system of the computer system of claim 17, further comprising computer-readable instructions for:
   reading in the first set of processor settings stored in memory, and
   writing the first set of processor settings to the processor, further comprising instructions whereby with respect to functionality associated with the first set of processor settings, the host operating system is logically coupled to the processor.

19. A computer-readable medium comprising computer-readable instructions for logically decoupling a host operating system from a processor of a computer system, comprising computer-readable instructions for:
   saving the contents of a set of registers on the processor to memory, the set of registers storing at least a part of the processor settings of the processor; and
   writing to the set of registers a replacement set of processor settings associated with functionality provided by a guest operating system that resides as an application program on the host operating system.

20. The computer-readable medium comprising computer-readable instructions for logically decoupling a host operating system from a processor of a computer system of claim 19, further comprising instructions whereby the replacement set of registers includes pointers to exception handler routines provided by the host operating system.

21. The computer-readable medium comprising computer-readable instructions for logically decoupling a host operating system from a processor of a computer system of claim 19, further comprising instructions whereby the replacement set of registers includes pointers to interrupt handler routines provided by the host operating system.

22. The computer-readable medium comprising computer-readable instructions for logically decoupling a host operating system from a processor of a computer system of claim 19, further comprising instructions whereby the replacement set of registers includes a page table associated with the host operating system.

* * * * *